United States Patent [19]

Stange et al.

[11] 4,062,538
[45] Dec. 13, 1977

[54] SPEED REGULATED FLUIDIC SHEET TRANSPORT

[75] Inventors: Klaus K. Stange, Pittsford; Richard E. Smith, Webster; Thomas J. Hamlin, Macedon; James R. Cassano, Penfield, all of N.Y.

[73] Assignee: Xerox Corporation, Stamford, Conn.

[21] Appl. No.: 649,757

[22] Filed: Jan. 15, 1976

[51] Int. Cl.² ..................... B65H 9/00; B65H 5/22
[52] U.S. Cl. .................................. 271/243; 271/195
[58] Field of Search ............... 271/195, 211, 243, 245

[56] References Cited

U.S. PATENT DOCUMENTS

| | | | |
|---|---|---|---|
| 1,107,859 | 8/1914 | Stevens | 271/211 |
| 1,947,211 | 2/1934 | McFarlane | 271/195 |
| 2,887,951 | 5/1959 | Strother et al. | 271/243 |
| 3,915,447 | 10/1975 | Perno | 271/243 |
| 3,918,706 | 11/1975 | Craft | 271/195 |

FOREIGN PATENT DOCUMENTS 468,077  10/1928  Germany .................. 271/195

*Primary Examiner*—Robert W. Saifer
*Attorney, Agent, or Firm*—Carlos Nieves; James J. Ralabate

[57] ABSTRACT

A transport includes a sleeve through which a belt having abutments is driven at a predetermined speed. The sleeve includes along one of its narrow walls a plurality of ports and each of the abutments includes a number of holes. Fluid injected in parallel with the wide walls of the sleeve exits through the ports and passes through the holes of an abutment in the sleeve. As a result, a sheet fed into the sleeve is biased against one of the abutments and the narrow wall and moves through the sleeve at the same speed as the belt. In moving through the sleeve at said predetermined speed, the sheet moves past a window in the sleeve. To eliminate flutter of the sheet as it moves past the window, fluid is injected through a wide wall of the sleeve, thereby biasing the sheet against the belt. As a result, slit-scan xerographic apparatus in cooperation with the window may be synchronized with the belt drive to provide a copy of information on the sheet.

8 Claims, 3 Drawing Figures

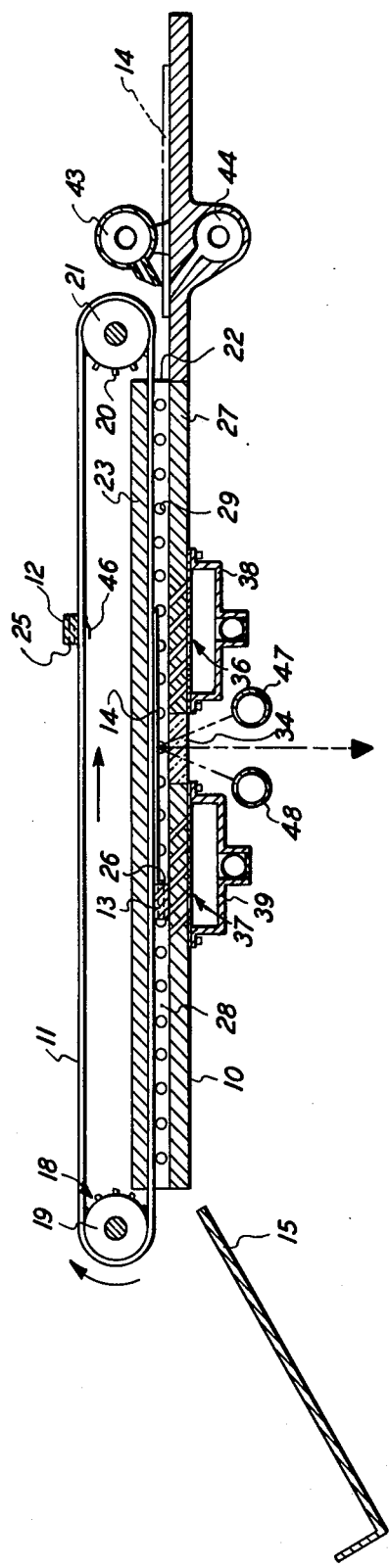
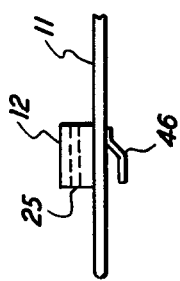
FIG. 2
FIG. 3

SPEED REGULATED FLUIDIC SHEET TRANSPORT

The subject invention generally relates to transports for moving articles at a predetermined speed and to fluidic transports, such as disclosed in copending U.S. patent application Ser. No. 627,571, Pneumatic Registration Apparatus, filed on Oct. 31, 1975, on an invention by Klaus K. Stange, and copending U.S. pat. application Ser. No. 636,336 Three-Way Pneumatic Registration Apparatus, filed on Nov. 28, 1975, on an invention by Klaus K. Stange, et al., both applications being assigned to the assignee herein, Xerox Corporation.

The use of fluid to move articles into registration with stops is a part of the public prior art which is relevant herein. In fact, such use of fluids is disclosed in U.S. Pat. No. 3,588,096, issued to Leigh D. Leiter on June 28, 1971. More particularly, the patent discloses apparatus wherein fabric is delivered to a horizontally disposed support including recessed areas housing upwardly pointed nozzles. The nozzles are aligned in two different directions, and the nozzles pointing in one direction are alternately actuated with respect to the nozzles pointing in the other direction to move the fabric into registration in perpendicular directions. Further, the use of fluids for rectilinearly moving an article within a conduit or chamber is also known. In fact, this concept is disclosed in U.S. Pat. No. 3,422,411, issued to J. E. Smith, Jr., on Jan. 14, 1969. More specifically, this patent discloses a data storage cartridge which has an enclosed transfer chamber housing a data storage card. Air pressure and vacuum pressure are switched between opposite ends of the chamber to reciprocally move the card rectilinearly in the chamber. A magnetic reading head extends through a hole in one wall of the chamber, and a recess is oppositely disposed on the other wall. As a result, when the card is moved the card is slightly deflected from its trajectory, and the head remains in contact with one side of the card. The engagement may be used to read or write on the card. In each of the patents referred to an article is transported at a reasonable speed but no mechanisms or devices have been noticed for moving the articles at a predetermined and precise speed.

It is noted that with the apparatus disclosed by Leigh D. Leiter, as fabric is advanced or when fabric which is smaller than the distance between nozzles is to be registered, some of the nozzles discharge into the surrounding air without having any effect on the fabric as it is moved into registration. Thus, pressurized air is wasted. In addition, it is noted that in the system disclosed by J. E. Smith, Jr., lateral registration is provided by the distance between walls of the chamber which are parallel to the direction of travel of the storage card. Thus, the system cannot be used with cards having different width dimensions.

It is an object of the present invention to provide apparatus for moving a sheet along a designated path at a predetermined speed.

Briefly, the invention herein includes: (a) an oblong sleeve for internally accommodating a sheet; (b) means for longitudinally moving an abutment through the sleeve; and (c) means for providing in the sleeve a fluid stream having a velocity component in the direction in which the abutment moves through the sleeve. As a result, when a sheet is placed in the sleeve an edge thereof is moved by the stream against the abutment and thereafter the sheet moves through at least a longitudinal section of the sleeve with the same speed as the abutment.

With a window in the sleeve the invention may be used with, for example, slit-scan xerographic apparatus to make copies of sheets bearing information.

Additional objects and features of the invention will become apparent by reference to the following description in conjunction with the accompanying drawings, in which:

FIG. 2 is a cross-sectional view taken along line 2—2 in FIG. 1; and

FIG. 3 is a partial side plan view of a driven belt and means for biasing an abutment on the belt against an inside surface of a sleeve of the apparatus.

Figure 1:
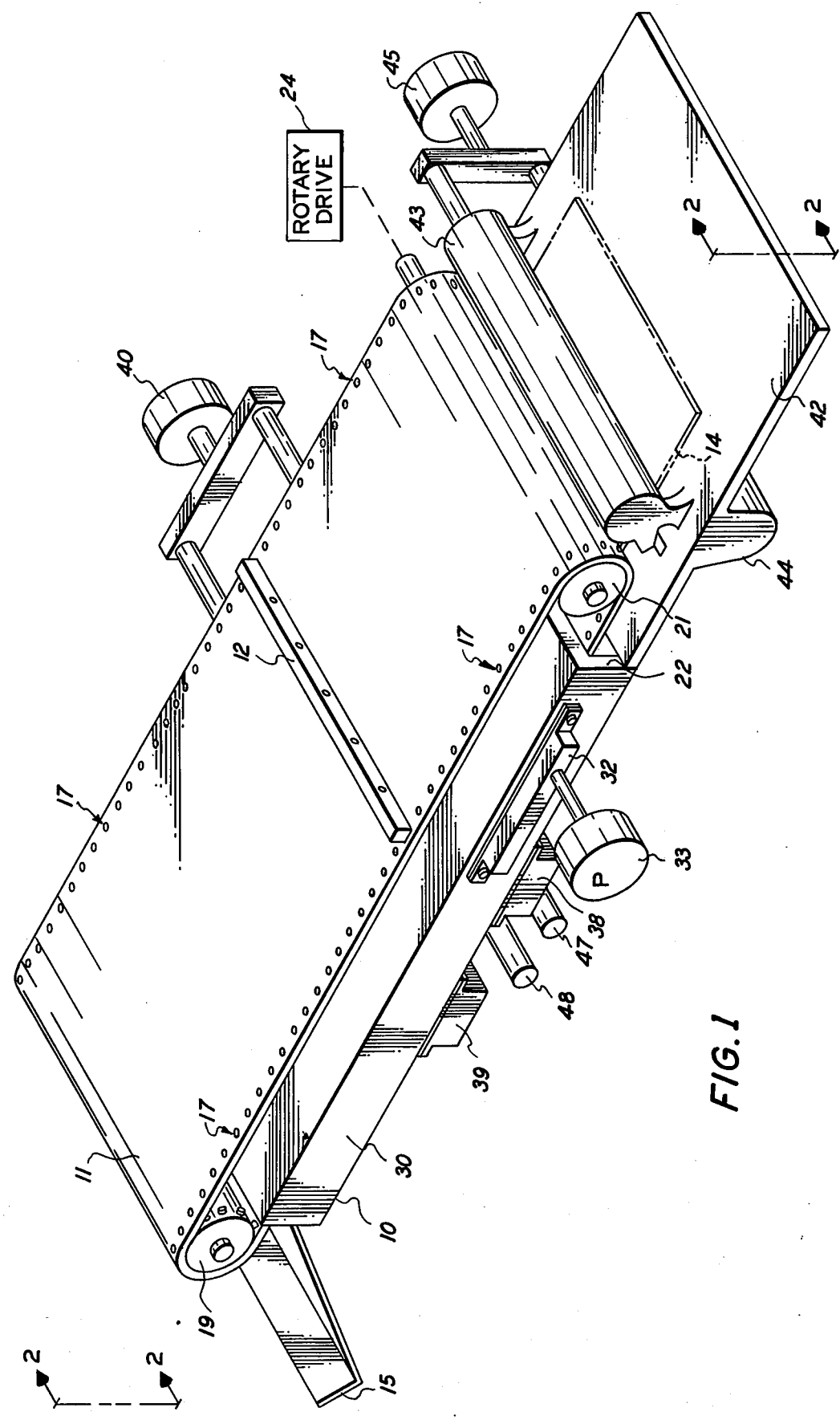
FIG. 1 is a perspective view of apparatus for moving a sheet at a predetermined speed according to the invention.

Referring to FIGS. 1 and 2, a typical embodiment of apparatus for moving a sheet at a predetermined speed includes a rectangular sleeve 10, a driven belt 11 passing through the sleeve, a pair of abutments 12 and 13 mounted on the belt, and fluidic devices for feeding and biasing a sheet against an abutment as it moves through the sleeve. With a sheet biased against an abutment the sheet is constrained to travel with the same speed as the driven belt and, therefore, the abutment may be thought of as a pacer. As an abutment against which a sheet 14 is biased exists from the sleeve the sheet is blown out of the sleeve and falls into a collection tray 15.

Closed belt 11 has a width which is slightly narrower than the inner width of sleeve 10 and includes perforations 17 disposed along each of its margins. The perforations are engaged by sprockets 18 on an idler roller 19 rotatably mounted adjacent the exit end of the sleeve and sprockets 20 on a driven roller 21 mounted adjacent the entrance end 22 of the sleeve. Rollers 19 and 21 are similar and are supported in parallel at a level which maintains the part of the belt in the sleeve in close proximity with the upper wide wall 23 of the sleeve. Movement of the belt through the sleeve is provided by a rotary drive 24 coupled to roller 21.

Abutments 12 and 13 are elongated members, almost as wide as the belt, fixed to the outer surface of the belt and each provides a surface 25 and 26 which, when moved through the sleeve, is perpendicular to the inner walls of the sleeve and faces the entrance end. Further, each abutment includes openings through which fluid can pass and a surface which when located in the sleeve is urged, as described below, into sliding contact with the lower wide wall 27 of the sleeve.

Sleeve 10 includes along one of its narrow walls 28 (see FIG. 2) a plurality of linearly disposed outlet ports 29 and on the other of its narrow walls 30, in a region near end 22 of the sleeve, a series of inlet ports (not shown). The inlet ports communicate with the chamber of a manifold 32 fixed to the sleeve and coupled to a fluid pump 33. As will be appreciated, the inlet ports are designed to inject fluid from pump 33 into the sleeve with velocity components in the direction of the exit end of the sleeve and in the direction of wall 28. Down stream from the inlet ports wall 27 includes a transparent window 34 substantially spanning the width of the wall. Each side of the window is flanked by a different plurality of inlet ports 36 and 37 coupled by manifolds 38 and 39, respectively, to a pump 40. Ports 36 and 37 are designed to inject fluid from pump 40 into the sleeve with velocity components in the direction of the exit end of the sleeve and in the direction of the upper wide wall 23. As more fully described below, the window and the apparatus for flanking the window with jets of air is used to provide a suitable exposure station for sheets moving through the sleeve.

In abutment with wall 27, at end 22, there is located a platform 42 which supports a pair of manifolds 43 and 44 coupled to a pump 45. When pump 45 is on the manifolds provide fluid streams such that a sheet 14 placed there between is driven into the entrance end of the sleeve. Referring to FIG. 3, opposite each of the abutments there is fixed to the belt a cantilever spring 46 which when an abutment is in the sleeve contacts upper wide wall 23 and biases the abutment against the wall 27 of the sleeve. Therefore, when a sheet is moved into the sleeve it cannot travel past an abutment in the sleeve.

Operatively, after one of the abutments, such as 13, moves into the entrance end of the sleeve pump 45 is momentarily actuated and a properly located sheet on the platform is fluidically moved into the sleeve. The fluid entering the sleeve passes through openings in abutment 13 and through some of the outlet ports 29. As a result, the fluid moves the sheet towards surface 26 and narrow wall 28. With a sheet in the sleeve pump 33 is turned on and provides a fluid stream which in passing through the openings and outlet ports registers the sheet against surface 26 and wall 28. Furthermore, the fluid stream maintains the registration as abutment 13 is moved through the sleeve. As the moving sheet enters the region where the window is located pump 40 is turned on and the sheet is additionally biased against the belt to eliminate whatever fluttering may be imposed on the sheet by the fluid stream created by pump 30. Thus, during this part of the operation the sheet is moving rectilinearly at a constant speed determined by drive 24. When the abutment exists from the sleeve the sheet is collected in tray 15. Abutments 12 and 13 are spaced such that after one leaves the sleeve the other enters. Therefore, as one sheet is being discharged pump 45 may be actuated to move another sheet into the sleeve. It should be noted that sheets of various sizes may be handled as described above.

Light provided by exposure lamps 47 and 48 may be used to illuminate sheets as they move past the window and slit-scan optics such as are used in the art of xerography may be used to project images or information on the sheets to photosensitive or photoconductive materials from which copies may be provided. Further, if the sheets are light sensitive the lamps may be replaced by a beam and means for moving the beam to write on the sheets. Obviously, in this mode of operation the platform or a feed station should be in a darkened area and tray 15 should be replaced with a development station.

The embodiment described may be modified in many ways without deviating from the spirit of the invention. For example, belt 11 may be replaced by two or more spaced belts. If desired, the structure may be modified so that the belt runs adjacent the bottom wide wall of a sleeve and the window is located in a top wide wall of the sleeve.

Therefore, it is to be understood that the description herein of a preferred embodiment, according to the invention, has been set forth as an example thereof and is not to be construed or interpreted to provide limitations on the claims which follow and define the invention.

What is claimed is:

1. Apparatus for moving a sheet at a predetermined speed, comprising:
    an elongated sleeve, having an oblong cross section, for internally accommodating said sheet, said sleeve having a pair of substantially parallel wide walls and a pair of narrow walls between the wide walls, one of the narrow walls having a plurality of ports;
    b. means for longitudinally moving an abutment through the sleeve, including a belt passing longitudinally through the the sleeve and means for moving the belt, said abutment having openings;
    c. means for providing in the sleeve a fluid stream having a velocity component in the direction in which the abutment moves through the sleeve, whereby when the sheet is placed in the sleeve an edge thereof is moved against the abutment and the narrow wall having ports by the stream as it passes through the openings and ports and thereafter the sheet moves through at least a longitudinal section of the sleeve with the same speed as the abutment; and
    d. fluidic means for biasing the sheet against said belt as the sheet passes through at least part of said longitudinal section.

2. Apparatus as defined in claim 1 wherein said means for providing a fluid stream in the sleeve includes a fluid source for injecting fluid into the sleeve at one of its ends.

3. Apparatus as defined in claim 1 wherein said means for providing a fluid stream in the sleeve includes means for injecting fluid through the other of the narrow walls.

4. Apparatus as defined in claim 1 wherein said abutment includes at least one surface which is perpendicularly located with respect to at least a longitudinal surface area on the narrow wall including the ports as the abutment moves through the sleeve and said fluidic means biases the sheet against said at least one surface.

5. Apparatus as defined in claim 4, wherein the edges of the belt face the narrow walls of the sleeve, wherein said abutment is mounted on an outside surface of the belt, and further including means for biasing the abutment against a wide wall of the sleeve.

6. Apparatus as defined in claim 1 wherein the longitudinal section of the sleeve includes a window, whereby a sheet biased against the belt and moving through the sleeve may be viewed, said sheet being out of contact with the window.

7. Apparatus as defined in claim 6 wherein said means for providing a fluid stream in the sleeve includes a fluid source for injecting fluid into the sleeve at one of its ends.

8. Apparatus as defined in claim 6 wherein said means for providing a fluid stream in the sleeve includes means for injecting fluid through the other of the narrow walls.

* * * * *